July 19, 1966  M. C. JUNGER ETAL  3,262,093
PRESSURE COMPENSATED SONIC TRANSDUCER
Filed Nov. 14, 1961  2 Sheets-Sheet 1

INVENTORS
MIGUEL C. JUNGER
KLAUS KLEINSCHMIDT
BY
ATTORNEYS

July 19, 1966 M. C. JUNGER ETAL 3,262,093
PRESSURE COMPENSATED SONIC TRANSDUCER
Filed Nov. 14, 1961 2 Sheets-Sheet 2

INVENTORS
MIGUEL C. JUNGER
KLAUS KLEINSCHMIDT
BY
ATTORNEYS ated July 19, 1966

3,262,093
PRESSURE COMPENSATED SONIC TRANSDUCER
Miguel C. Junger, Belmont, and Klaus Kleinschmidt, Cambridge, Mass., assignors, by mesne assignments, to the United States of America as represented by the Secretary of the Navy
Filed Nov. 14, 1961, Ser. No. 152,257
9 Claims. (Cl. 340—10)

The present invention relates generally to sonic transmitting and receiving transducers such as those used in sonar, oceanographic research and submarine prospecting. More particularly, it relates to transducers adapted for submergence in fluids at many atmospheres of pressure, for example, in the ocean at considerable depths.

This invention is concerned with transducers of the hollow shell form, that is, of a shape which is generally symmetrical about a given axis or point, such as a cylinder or a sphere. These configurations are particularly desired for sonar applications requiring axially symmetrical wavefront patterns. Known transducers of this general form include both the piezoelectric and the magnetostrictive types. The cylindrical configuration is common and may comprise, for example, an integrally-cast piezoelectric body with electrodes deposited upon the internal and external surfaces; or there may be a series of longitudinal stave-like piezoelectric elements arranged to form a hollow cylinder, with electrodes either on the internal and external surfaces or at the interfaces between the stave-like elements.

The principal useful mode of vibration of transducers of the hollow shell form is that mode which is characterized by radial excursions of the surfaces. Thus the transducer expands and contracts cyclically and uniformly about its circumference, thereby transmitting sonic waves from its outer surface to the surrounding medium when used as a transmitter, or generating an alternating current when used as a receiver.

In transducers of the hollow shell configuration one or more open ends or vents may be provided to allow the surrounding fluid to enter the interior space and thereby to equalize the pressures acting on the vibrating element. Such transducers are known as the "free-flooding" type. In this type the acoustical coupling of the inner surface to the fluid produces a "squirting" action, which is an oscillatory movement of the fluid in the vent or vents propagating waves into the surrounding fluid. This effect is frequently undesired because it may result either in partial cancellation of the power radiated from the external surface of the transducer or in loss of directive properties, depending on the phase relationship of the end-propagated waves to those propagated by the external surface. Also, the radiation loading of the fluid on the inner surface may be undesired.

When transducers are to be immersed in fluids at pressures which are not too great compared to atmospheric, elimination of squirting action and of internal radiation loading can be accomplished by rigidly enclosing the interior space. This space may contain an easily compressible gas or mixture of gases such as air at pressures in the general region of atmospheric, and its effect on operation of the transducer is small. This arrangement is acceptable if the transducer is under relatively small hydrostatic stress due to the pressure differential between the interior and exterior spaces. At elevated pressures, however, this differential may cause structural failure of the transducer and may produce malfunctioning of a piezoelectric shell by depolarization of its crystalline structure.

Pressure release linings are sometimes applied to the inner surfaces of transducers, but these are also unsuitable at hydrostatic pressures that would cause their collapse. In practice, therefore, it has been commonly assumed hitherto that free-flooding transducers must be employed in applications where they are subjected to extreme hydrostatic pressures.

A principal object of this invention is to reduce squirting action of transducers to be used under great pressures.

A second object is to eliminate or substantially reduce the radial loading effect upon the transducer of the fluid within it. The nature and properties of this loading are more fully described below.

A further object is to overcome the foregoing problems of high pressure applications without reverting to the disadvantages of free-flooding transducers.

With the foregoing and other objects hereinafter discussed in view, a principal feature of this invention resides in the provision of a transducer of the hollow shell type with an expansible-contractible pressure release body situated in the interior space, this body being sealed under operating conditions and being substantially more compressible than the surrounding fluid.

A second feature resides in the provision of means to support the compressible body within the internal space and with clearance about the body so as to provide communication with the surrounding fluid through a vent in an end of the transducer. This provides for equalization of the fluid pressures at the interior and exterior surfaces of the vibrating transducer element, thereby relieving this element of these stresses.

According to another feature, the compressible body is so constructed and supported in the interior space of the transducer that is experiences oscillatory volumetric expansion and contraction substantially equal to and in phase with the corresponding changes in the interior volume resulting from the excursions of the vibrating transducer element. This results in minimal or negligible squirting of the medium through the vent which at the same time provides communication between the interior and exterior spaces.

Other features of the invention reside in certain details of construction, arrangements of the parts and modes of operation which will be more clearly understood from the following description thereof, having reference to the appended drawings illustrating the same, in which.

Figure 1:
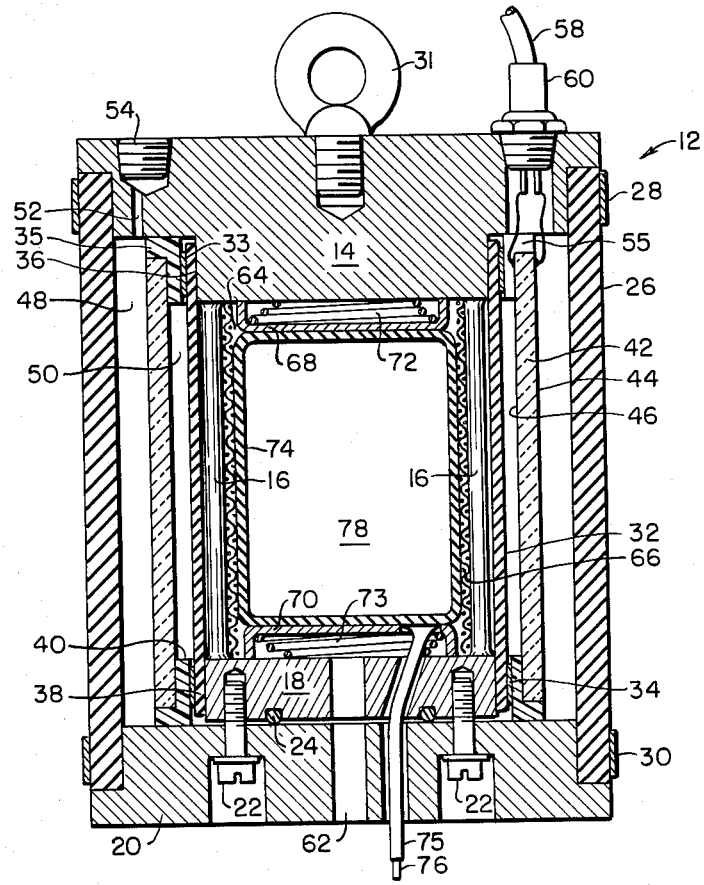
FIG. 1 is an elevation in section of a first embodiment preferred for certain conditions of operation.

FIG. 1 shows a transducer designated generally at 12 and having a circular end plate 14. A number of spacer rods 16, for example three, are welded between this plate and a circular plate 18 to form a squirrel-cage frame. An end plate 20 is secured to the plate 18 by screws 22. An annular O-ring 24 is compressed between the plates 18 and 20. The space between the plates 14 and 20 is entirely enclosed by an imperforate rubber or rubber-like cylindrical elastic outer boot 26 secured by a suitable cement and metal straps 28 and 30. An attachment ring 31 is threaded into the plate 14 and provides means to attach the device to a cable by which it may be lowered into a sonic transmission medium such as the ocean.

An elastic rubber or rubber-like imperforate inner cylindrical boot 32 encloses a space between the plates 14 and 18. Metal straps 33 and 34 compress the boot against a shoulder 36 of the plate 14 and an annular surface 38 of the plate 18. Against these straps are fitted a pair of annular plastic insulator rings 35 and 40 which support the ends of a hollow annular cylindrical transducer element 42. The present invention is not concerned with the specific construction of the transducer element. For purposes of illustration this element is shown as consisting of a unitary hollow cylindrical body of barium titanate, a piezoelectric crystalline structure, having metallic electrodes 44 and 46 coated or deposited upon its interior and exterior surfaces. If desired, any suitable magnetostrictive transducer may be substituted.

The boots 26 and 32 and the element 42 define annular spaces 48 and 50. These spaces are filled with oil through a fill hole 52 closed by a plug 54. A second fill hole and plug, not shown, are also provided to facilitate the filling and evacuation of the oil spaces. The spaces 48 and 50 are in communication through a break 55 in the ring 35.

Electrical connections are made by a coaxial cable 58 to the electrodes 44 and 46, preferably by means of a suitable connector 60.

The plates 18 and 20 have central holes defining a vent 62. This vent provides communication between the exterior of the transducer 12 and the space within the inner boot 32, this entire latter space being designated generally as 64. A cylindrical woven wire screen 66 is fitted inside the rods 16. Circular metal cup-shaped spacers 68 and 70 are also provide, the spacer enclosing coil springs 72 and 73. Within the screen is situated an expandable bladder 74 preferably made of rubber or rubber-like material. The spacers 68 and 70 and the screen 66 comprise spacer means and are arranged to permit communication under operating conditions between the vent 62 and substantially the entire peripheral space about the bladder 74, whereby the external fluid communicates with the portion of the space 64 outside the bladder. The spacers also serve to hold the bladder in a central location in the space 64 when the bladder shrinks under high pressure as described below. Because of the flexible property of the inner boot 32, the fluid pressure is communicated through the oil in the space 50 to the interior surface of the vibrating element 42.

The bladder 74 has a neck 75 passing through holes in the plates 18 and 20. The neck is connected to a valve seal 76 which is normally closed. To prepare the transducer for operation the bladder 74 is initially filled with gas or a gas mixture, such as air, to a pressure bearing a predetermined relation to the pressure of the fluid in which it will be immersed. Before submergence of the transducer 12 into the medium and while the exterior is at atmospheric pressure, the initial pressure within the bladder 74 causes it to expand until constrained on all sides by the screen 66 and the spacers 68 and 70. The springs 72 and 73 are compressed.

Figure 1A:
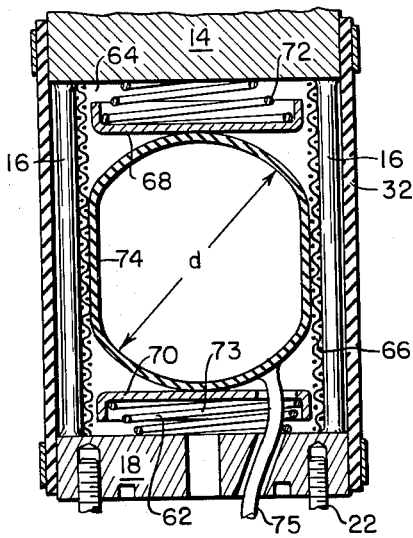
FIG. 1a is a fragmentary view showing the device of FIG. 1 under operating pressure.

As the transducer is lowered into the transmitting fluid, the fluid pressure increases in direct proportion to depth, and this pressure is readily communicated to the space 64 about the bladder 74. The pressure tends to shrink the bladder which is held in a central position by the springs 72 and 73, and the volume of the bladder varies reciprocally with the external pressure. At a given depth chosen for operation, the position is as represented in FIG. 1a.

For reasons which will be more fully evident below, it is desirable for the bladder to occupy a large portion of the space 64 at the operating pressure. To this end an initial pressure $p$ is applied to the interior of the bladder, which causes the bladder to expand to the maximum volume $v$. At given operational pressure P within the bladder the volume is reduced to V. Since $pv=PV$, it is possible to vary the value $p$ to increase the ratio of V to $v$ as desired.

The structure described above may be used either for a transmitter or for a receiver of sonic waves. For operation as a transmitter, an electrical voltage is applied across the electrodes 44 and 46 by means of the cable 58. Through the piezoelectric effect, radial excursions occur in the element 42, which are transmitted radially of the transducer to the surrounding medium through the flexible wall of the boot 26. Also, oscillatory variations occur in the volume defined by the inner surface of the element 42. The vibrations pass through the oil in the space 50 and cause oscillatory variations in the volume of the space 64 confined by the boot 32. Since the gas within the space 78 is very much more compressible than the surrounding fluid, substantially all of the volumetric change produced in the space 64 by expansion and contraction of the boot 32 is balanced by substantially equal in-phase expansion and contraction of the bladder 74, and very little of the fluid in the space 64 is squirted through the vent 62. The bladder 74 acts as a pressure release element and the improved transducer is found to have the advantages of free-flooding transducers insofar as interior and exterior pressure equalization is concerned, without having the disadvantages of the squirting features and added inner radiation loading hitherto associated with that type of transducer.

It will be noted that more than one vent 62 may be provided if desired, the principal consideration being that the space 64 has communication with the exterior in order to equalize the pressures.

A further understanding of the features of the transducer described above can be gained from consideration of a series of cases. We may consider a first ideal case in which a hollow cylindrical transducer element is situated in an evacuated chamber and assumed to vibrate in the same mode as that of the devices shown in FIGS. 1 and 2, namely, with purely radial excursion of the surfaces. It is found that if the element is given an electrical alternating current excitation of constant amplitude, and if the frequency of excitation is gradually increased from zero, a frequency will be reached in which a resonant condition results, that is, a condition in which the radial excursion of the cylinder significantly increases. This frequency is found to vary directly as the velocity of the exciting waves in the material of the transducer, this velocity in turn varying directly as the square root of Young's modulus for the material and inversely as the square root of its density. The lowest frequency at which resonance occurs is termed the fundamental or natural frequency of the transducer. It is also found that the natural frequency varies inversely as the mean diameter of the cylinder.

We may next consider a second case in which the same transducer has its ends rigidly closed with the enclosed space containing air, the transducer being immersed in water. The water comprises an acoustic load or impedance for the transducer, termed the "radiation impedance." It consists of a reactive component resulting from the inertia of the mass of the water, termed the "mass load," and a resistive component resulting from the loss of energy to the system through the propagation of acoustic waves. It is found that the mass load causes the transducer to resonate at a lower frequency, as if its own density were increased.

Considering as a third case the condition which exists upon removal of the end closures in the second case, the cylinder is free-flooding and additional loading is produced by the water within the cylinder. This added loading includes the same kinds of components as the external loading with an additional load, namely, that produced by compression of the water, since it is externally confined. Thus there are two reactive radiation impedance components resulting respectively from mass loading and compressibility of the water inside the transducer. The column of water within the cylinder comprises a body having its own natural frequency for the given axially symmetrical mode of vibration. If the transducer is vibrated at the natural frequency of this column, there is a negligible radiation impedance presented to the inside of the transducer, as in the second assumed case. If it is vibrated below this frequency the reactance appears as a mass load, and if it is vibrated above this frequency the reactance appears as a spring load. In either of the last two instances an undesired increase in the radiation load results, and squirting action also results. This action produces end-propagated waves which may either be in phase with the waves propagated from the external surface, in which case the transducer is less directive than in the second case, or out of phase therewith, in which case there is phase cancellation and loss of acoustic power output from the transducer.

A fourth assumed case is the condition in which the transducer of the third case is vibrated at its natural frequency for the given external acoustic load, this frequency being other than the natural frequency of the liquid column within the cylinder, but in which a pressure release element such as the air bladder 74 of FIG. 1 fills most of the space inside the cylinder. The air is much more compressible than the water; hence, the water is not significantly compressed and comprises merely an inertial or mass load on the transducer similar to the external mass load. Small or negligible squirting action occurs. Consequently, the operating characteristics in this case are simliar to those in the second case. However, as previously shown, the transducer may be employed at greater hydrostatic pressures than those permitted in the second case because the internal and external pressures are equalized.

The desirability of an air bladder of large volume under operating pressure may now be seen. One reason is that water in the space 64 comprises undesired mass loading. Another reason is that the wall of the bladder should be not more than one-quarter wavelength from the inner wall of the transducer element 42 at operating pressure, so that the variations in volume defined by the inner wall of the transducer element will be close in magnitude and phase to the variations in the volume of the bladder. Thus also, the axial length of the space 64 should not exceed one-half the wavelength plus the diameter $d$ which the bladder approaches at operating pressure, as shown in FIG. 1a.

A number of adaptations of the foregoing teachings may be carried out in particular applications. For example, the oil in the spaces 48 and 50 may be replaced by a potting compound, such as a soft plastic material. Also, various known methods may be employed to apply initial pressure to the bladder. These may include manual or automatic means, and provision may be made using known techniques to cause pressure to be released to the bladder automatically in response either to the exterior pressure or to depth as the transducer is submerged. The gas or gases may be contained in a pressurized cartridge attached to the transducer and connected with the valve seal 76.

Also, in the case of a long cylindrical transducer array a number of separate longitudinally-spaced bladders may be used to provide the necessary pressure release conditions along the entire length of the cylindrical array. In that case, applying the criteria explained above, the bladders should be so spaced that at the operating pressure their centers will be spaced one-half wavelength plus the longitudinal dimension of a single bladder at that pressure.

Figure 2:
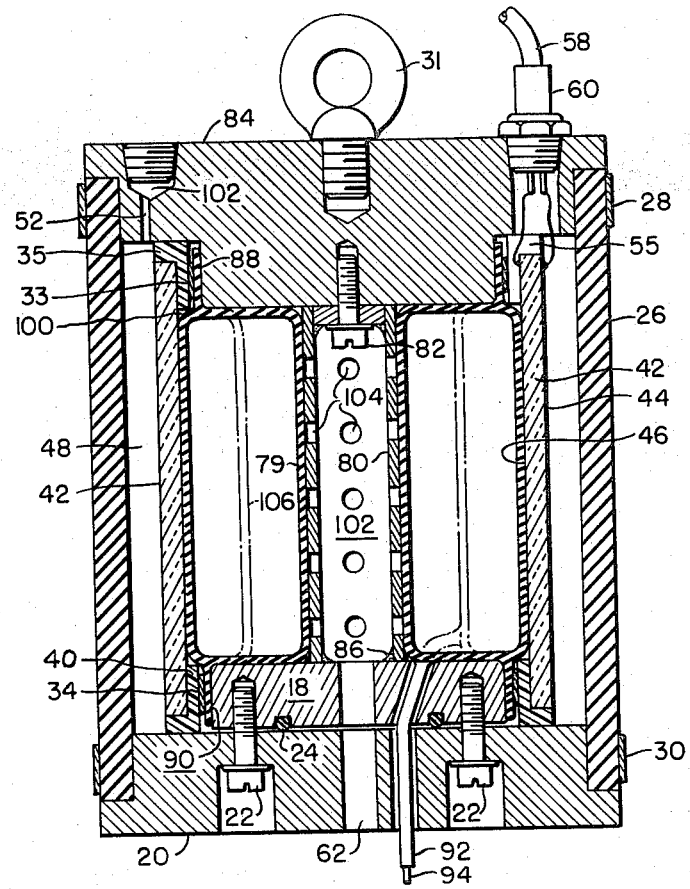
FIG. 2 is an elevation in section of a second embodiment preferred for certain other conditions of operation.

FIG. 2 shows an alternative construction employing a hollow toroidal bladder 79. The outer portions of the structure are essentially identical to those of FIG. 1, like parts being numbered the same in FIGS. 1 and 2. Within the bladder is a hollow perforated cylindrical metal tube 80 having a closed end and secured by a screw 82 to an end plate 84 similar to the plate 14 of FIG. 1. The tube is soldered at 86 to the plate 18. The bladder has molded lips 88 and 90 secured to the plates 84 and 18 by the straps 33 and 34. The bladder also has a neck 92 extending through the plates 18 and 20, the neck being closed by a valve seal 94. In this embodiment only the outer rubber boot 26 is used. This boot seals the oil-filled space 48 surrounding the transducer element 42. Oil may also enter a space 100 through the fill hole 52 and the break 55 in the ring 35. The cable 58 is connected to the element 42 as in FIG. 1.

In FIG. 2 the vent 62 leads to a central space 102 communicating with the inner annular surface of the bladder 79 through holes 104 in the tube 80. Upon an increase in pressure the toroid becomes thinner, its inner wall moves away from the tube as shown at 106 in dotted lines, and its outer wall remains against the inner wall of the transducer 42. An advantage of this construction is that it eliminates water from the space between the transducer and the bladder, allowing them to be in contact under operating pressure. Mass loading by the water inside the transducer is eliminated. The resonant frequency will therefore be higher than that achieved by use of the bladder 74 of FIG. 1.

In the design of a transducer according to this invention, it should be noted that the bladder itself has a natural frequency. The transducer should be operated above this frequency, so that the bladder comprises a compressive reactance which quickly contracts when the space which it occupies is contracted, thereby preventing squirting action.

Various applications may be made of the transducers herein described. For example, the device of FIG. 1 may be used for continuously sending out a signal indicative of its depth. It has been noted above that mass loading by the water within the transducer increases with hydrostatic pressure and depth. At the same time, the natural frequency decreases. If it is excited as a transmitter by a source containing frequencies throughout the range of natural frequencies which may be experienced, such as "white noise," the strongest signal to be sent at any given depth will be at the natural frequency to which that depth corresponds.

It will be appreciated that various modifications of structure may be accomplished by one skilled in this art after a reading of the foregoing specification, without departing from the spirit or scope of the invention.

Having thus described the invention, we claim:

1. A deep, submersible acoustic transducer comprising, in combination, an annular element made of a material possessing piezoelectric properties, a pair of rigid end plates connected to the opposite rim portions of said annular element and sealing off the interior thereof, an expansible, contractible bladder positioned within the interior of said annular element, said bladder being inflated with a gaseous substance such that when said transducer is at the surface said bladder fills a major portion of the interior of said annular element, a passageway cut through one of said end plates for establishing fluid communication between the exterior of said bladder and the fluid medium whereby the volume of said bladder varies in accordance with the depth at which said transducer is operated.

2. In an arrangement as defined in claim 1, outer and inner flexible sleeves, said sleeves being concentrically positioned with respect to said annular element and being positioned on opposite sides of said annular element and spaced therefrom, said sleeves forming part of an annular, fluidtight space within which said annular element is disposed.

3. In an arrangement as defined in claim 2, a cylindrical wire screen positioned within the interior of said annular, fluidtight space between the exterior wall of said bladder and the inner surface of said inner flexible sleeve whereby when said transducer is immersed in a fluid medium the fluid can contact substantially the complete exterior of said bladder.

4. In an arrangement as defined in claim 3, spring means interposed between the inner walls of said rigid end plates and opposite exterior wall portions of said bladder for compressing said bladder and maintaining it in a central position within said cylindrical screen.

5. In an arrangement as defined in claim 4 wherein said annular, fluidtight space is filled with a compressible material which supports the propagation of acoustic energy therethrough.

6. In an arrangement as defined in claim 1 wherein the exterior wall of said bladder is not more than one quarter wave length at the operating frequency of said transducer from the inner wall of said annular element when said transducer is at its operating depth.

7. A sonic transducer comprising, in combination, a pair of end plates, an annular transducer element having interior and exterior spaces and supported between the end plates, electrical connections on the transducer element, inner and outer flexible boots secured to the end plates within and surrounding the transducer element, respectively, and defining a central space and closed spaces adjacent the interior and exterior surfaces of said element, respectively, at least one of the end plates having a vent to said central space, pressure transmitting material filling said closed spaces, and an expansible-contractible member situated within the central space.

8. The combination according to claim 7, in which the expansible-contractible member has an outer wall and the vent is in communication with said outer wall.

9. The combination according to claim 7, in which the expansible-contractible member is a sealed gas-filled bladder having an annular wall in communication with the vent.

References Cited by the Examiner
UNITED STATES PATENTS

| | | |
|---|---|---|
| 2,406,767 | 9/1946 | Hayes. |
| 2,490,595 | 12/1949 | Merten. |
| 2,978,672 | 4/1961 | Barney. |

CHESTER L. JUSTUS, *Primary Examiner.*

LEWIS H. MYERS, *Examiner.*

C. F. ROBERTS, G. M. FISHER, *Assistant Examiners.*